Jan. 5, 1954     F. J. LINGEL     2,665,399
RECTIFIER ASSEMBLY
Filed Aug. 12, 1952
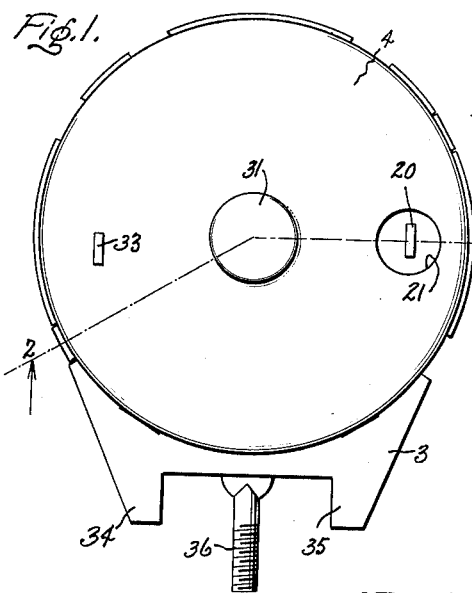
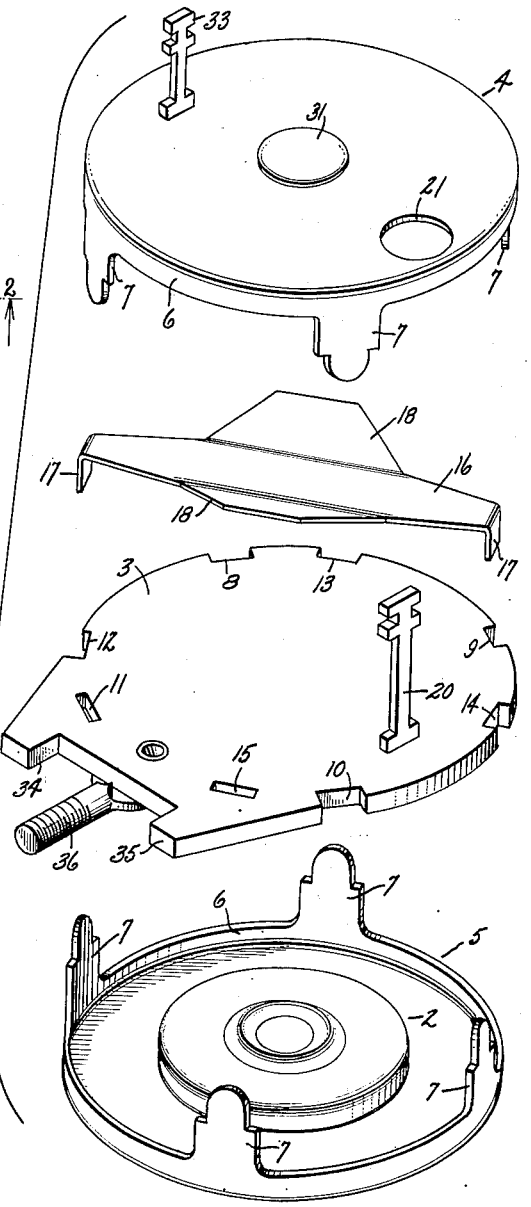
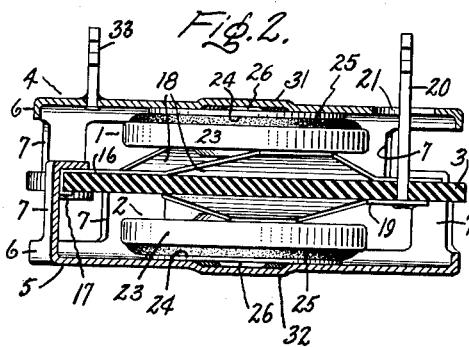
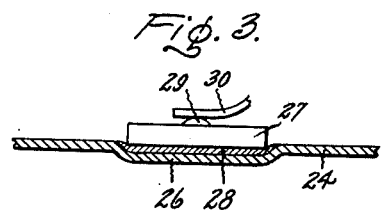
Inventor
Fred J. Lingel
By *Morton D. Moore*
His Attorney

Patented Jan. 5, 1954

2,665,399

UNITED STATES PATENT OFFICE 2,665,399

RECTIFIER ASSEMBLY

Fred J. Lingel, Syracuse, N. Y., assignor to General Electric Company, a corporation of New York Application August 12, 1952, Serial No. 303,906

5 Claims. (Cl. 317—234)

1

The present invention relates to an improved rectifier assembly and more particularly to an improved assembly providing for the mounting and cooling of a plurality of rectifier units of the solid type.

During recent years there has been rapid progress in the development of rectifying devices of the solid type particularly those employing rectifying units of semi-conductor material, such as germanium. These units differ somewhat from the rectifier units of copper oxide or selenium, for example, and involve different problems. As a result, conventional mounting arrangements are not totally satisfactory for these semi-conductor rectifier devices. While in its broader aspects the mounting arrangement of my invention is applicable to rectifier units generally, it is particularly useful in connection with semi-conductor rectifier units of the type described and claimed in my copending application, Serial No. 246,827, filed September 15, 1951 and assigned to the assignee of this application.

The present invention provides mechanical structure for mounting a pair of rectifier units in series relation for conduction in the same direction which is rugged, simple and provides very good cooling of the rectifying elements. This last feature is very important in connection with semi-conductor devices of germanium since temperature limitations are very important considerations in the application of these devices.

The objects and advantages which characterize my invention will become more apparent as the following description proceeds reference being had to the accompanying drawing, and its scope will be pointed out in the appended claims. In the drawing Fig. 1 is an elevational view of a rectifier assembly embodying my invention; Fig. 2 is a sectional view taken along the line 2—2 of Fig. 1; Fig. 3 is an enlarged sectional view of a portion of one of the rectifier units shown in Fig. 2, and Fig. 4 is an exploded view in perspective of the device shown in Fig. 1.

Referring now to the drawing I have shown my invention embodied in a supporting and cooling arrangement for a pair of rectifying units designated generally by the numerals 1 and 2 and including a supporting plate 3 of insulating material and a pair of cooling plates 4 and 5 of a material having good thermal and electrical conductivity, such as copper. Each of the cooling members is of the same construction and in the specific form illustrated is a circular disk having an inwardly directed flange 6 at the edge thereof. Each cooling member is provided with a plurality of fastening means in the form of integral lugs 7 projecting from the edge of the flange 6. The lugs 7 of the cooling plate 4 are received in recesses 8, 9 and 10 and opening 11 provided in circumferentially spaced relation on the mounting plate 3. In a similar manner, the lugs 7 of the cooling plate 5 are received in recesses 12, 13 and 14 and opening 15 which are also spaced around the circumference of the plate 3 but displaced angularly with respect to the recesses 8, 9, 10 and opening 11. As illustrated in Fig. 2, the ends of the lugs 7 are bent over against the face of the insulating plate remote from the cooling plate to which they are attached so that the plate is mounted in spaced relation with respect to the insulating plate. Spring contacts of Phosphor bronze or similar material are secured to opposed faces of the insulating plate for making contact with one terminal of each of the rectifier units. As illustrated in the drawing, spring contact 16 is positioned on the upper face of the plate as viewed in Fig. 2 by means of lugs 17 extending into recesses 12 and 14 and secured by the lugs 7 of the lower cooling plate 5 while lying in those recesses. The contact is provided with outwardly and upwardly extending wing portions 18 which resiliently engage one side of the rectifier unit 1, as will be described in more detail at a later point in the specification. A similar contact 19 is secured to the lower face of the insulating plate. This contact is somewhat shorter and is oriented in a circumferentially displaced position with respect to the upper contact 16. Contact 19 is secured to the insulating plate 3 by means of a terminal member 20 which extends through the plate and also through a clearance opening 21 in the upper cooling plate 4.

Although the particular form of the rectifier unit is not essential to the present invention, rectifier units of the type described and claimed in my above-mentioned copending application may be employed to particular advantage. These units are in the form of enclosed units including opposed walls 23 and 24 which provide the terminals of the rectifier unit and also provide a sealed casing, the seal being accomplished by means of a suitable gasket 25 which is compressed between the terminal sections 23 and 24. As illustrated in the enlarged sectional view shown in Fig. 3, the lower terminal 24 is provided with a centrally located circular indentation 26 in which is located a rectifying element of the broad area type and consisting of a germanium wafer 27, a base contact of fernico 28 and an impurity dot 29 on the other face of the germanium wafer which has been partially diffused into the wafer to provide the rectification junction. A suitable contact strip 30 is soldered to the impurity dot 29 for connection with the other terminal 23 of the unit. The base contact is preferably soldered into the indentation 26 to provide good mechanical and thermal contact therewith.

In assembling the rectifier units they are preferably soldered to indentations 31 and 32 formed in the cooling plates 4 and 5 to provide good thermal and electrical contact the rectifying unit including the rectifying elements provided by the germanium wafers. The soldering also permanently attaches the rectifying units to the cooling plates and facilitates the remainder of the assembly operation. In order to provide for the best cooling of the units, they are mounted with corresponding terminals connected to the cooling plates; that is, the terminals 24 connected with the base contacts of the rectifier elements are bonded to the cooling plates 4 and 5.

The construction described also provides for a series circuit of the devices for conduction in the same direction in the following manner:

The terminal 20 is connected through spring contact 19 to the upper terminal 23 of rectifier unit 2, through this unit to the cooling plate 5, and by way of two of the lugs 7 to spring contact 16, the lower terminal 23 of rectifier unit 1, through the unit to the upper terminal 24 of unit 1, and cooling plate 4. A second terminal 33 may be secured to the cooling plate 4 to facilitate the making of circuit connections.

The mounting plate of insulating material 3 is shaped to provide a pair of locating lugs 34 and 35 between which extends a mounting screw 36. It will be apparent that this construction provides an easy arrangement for mounting the unit on a chassis, either in a vertical or horizontal position. With either horizontal or vertical mounting of the assembly the cooling members 4 and 5 may extend vertically without any requirement for special mounting brackets. This results from the parallel relation of the positioning lugs 34 and 35 and the mounting screw 36.

From the foregoing detailed description it is apparent that my invention provides an arrangement which permits the units to be mounted with the corresponding terminals connected with the cooling plates on the exterior of the assembly. The invention also provides the necessary circuit connections to connect the units in series for conduction in the same direction. The overall effect is to provide for much more adequate cooling of the units than would result from the simple expedient of stacking the units in series relation; that is, with one terminal of one unit in direct contact with the opposite terminal of the other unit.

While I have described and claimed a particular embodiment of my invention it will be apparent to those skilled in the art that changes and modifications may be made without departing from my invention in its broader aspects, and I aim, therefore, in the appended claims to cover all such changes and modifications as may fall within the true spirit and scope of my invention.

What I claim as new and desire to secure by Letters Patent of the United States is:

1. A rectifier assembly comprising a pair of enclosed rectifier units each including opposed conducting walls forming terminals of the unit, means for mounting said units and connecting them in series for conduction in the same direction including an insulating plate, a pair of cooling plates of conducting material secured in spaced relation on opposite sides of said insulating plate and each retaining one of said units between said cooling plates with a corresponding one of said terminals of said units electrically connected respectively with said cooling plates, a contact member interposed between the other terminal of one of said units and said insulating plate on one side thereof and connected with the cooling plate on the remote side of said insulating plate, a contact member interposed between the other side of said insulating plate and the remaining terminal of the other of said units and the terminal connected with said last-mentioned contact and extending through said insulating plate and through a clearance opening in the other of said cooling plates.

2. A rectifier assembly comprising a pair of rectifier units each including a pair of opposed terminals, means for mounting said units and connecting them in series relation for conduction in the same direction including an insulating plate, a pair of cooling plates of conducting material secured in spaced relation on opposite sides of said insulating plate, and retaining one of said units between each of said cooling plates and said insulating plate with a corresponding one of the terminals of said units electrically connected respectively with each of said cooling plates and means connecting the other terminal of one of said units with the cooling plate on the opposite side of said insulating plate.

3. A rectifier assembly comprising a pair of enclosed rectifier units each including opposed conducting walls forming terminals of the unit, means for mounting said units and connecting them in series for conduction in the same direction including an insulating plate, a pair of cooling plates of conducting material secured in spaced relation on opposite sides of said insulating plate and retaining one of said units between each of said cooling plates and said insulating plate with a corresponding one of the terminals of said units electrically connected respectively with each of said cooling plates and means connecting the other terminal of one of said units with the cooling plate on the remote side of said insulating plate.

4. A rectifier assembly comprising a pair of enclosed rectifier units each including opposed conducting walls forming terminals of the unit, means for mounting said units and connecting them in series for conduction in the same direction including an insulating plate, a pair of cooling plates of conducting material secured in spaced relation on opposite sides of said insulating plate and retaining one of said units between each of said cooling plates and said insulating plate with a corresponding one of the terminals of said units electrically connected respectively with said cooling plates, a contact member interposed between the other terminal of one of said units and said insulating plate on one side thereof and connected with the cooling plate on the remote side of said insulating plate and a contact member interposed between the other side of said insulating plate and the remaining terminal of the other of said units.

5. A rectifier assembly comprising a plurality of rectifier units and a plurality of mounting plates including cooling plates between which said units are secured and means for mounting and positioning said assembly including a positioning lug extending from one edge of one of said mounting plates and elongated fastening means extending from said one of said plates in generally parallel relation to said positioning lug.

FRED J. LINGEL.

References Cited in the file of this patent

UNITED STATES PATENTS

| Number | Name | Date |
| --- | --- | --- |
| 2,545,863 | Sell et al. | Mar. 20, 1951 |
| 2,574,783 | Hedding et al. | Nov. 13, 1951 |
| 2,586,539 | Harty | Feb. 19, 1952 |